United States Patent [19]

Alessi et al.

[11] Patent Number: 4,979,032
[45] Date of Patent: Dec. 18, 1990

[54] COLOR IMAGING APPARATUS PRODUCING ON VARIOUS IMAGE RECEPTIVE MATERIALS A VISUALLY MATCHED HARD COPY REPRODUCTION OF A VIDEO IMAGE DISPLAYED

[75] Inventors: Paula J. Alessi, Webster; Edward J. Giorgianni; Thomas E. Madden, both of Rochester, all of N.Y.

[73] Assignee: Eastman Kodak Company

[21] Appl. No.: 290,677

[22] Filed: Dec. 27, 1988

[51] Int. Cl.⁵ .................. H04N 9/11; H04N 1/46
[52] U.S. Cl. ........................................ 358/76; 358/80
[58] Field of Search .......................... 358/76, 80

[56] References Cited

U.S. PATENT DOCUMENTS

| | | | |
|---|---|---|---|
| 4,278,995 | 7/1981 | Fearnside et al. | 358/54 |
| 4,285,009 | 8/1981 | Klopsch | 358/80 |
| 4,500,919 | 2/1985 | Schreiber | 358/80 |
| 4,631,551 | 12/1986 | Vergona | 358/75 |
| 4,734,763 | 3/1988 | Urabe et al. | 358/80 |
| 4,797,712 | 1/1989 | Hayashi et al. | 358/76 |
| 4,812,879 | 3/1989 | Suzuki | 358/76 |

Primary Examiner—James J. Groody
Assistant Examiner—Mark R. Powell

[57] ABSTRACT

Color image reproduction apparatus includes a video monitor for displaying a reproduced image (a soft copy). A film writer serves to produce a hard copy of the reproduced image on any of a variety of image-receptive output media (reversal film or negative film to print material or reversal film to print material) having perceptually distinct color reproduction properties. A computer-based workstation, having a series of look-up tables for transforming imaging data to a variety of monitor-dependent RGB color spaces, enables the film writer to expose an output film (reversal or negative) such that the hard copy reproduction formed is visually matched to the soft copy proof, regardless of the output medium selected.

4 Claims, 4 Drawing Sheets

COLOR IMAGING APPARATUS PRODUCING ON VARIOUS IMAGE RECEPTIVE MATERIALS A VISUALLY MATCHED HARD COPY REPRODUCTION OF A VIDEO IMAGE DISPLAYED

CROSS-REFERENCE TO A RELATED APPLICATION

Reference is hereby made to U.S. patent application Ser. No. 07,290,676 entitled COLOR IMAGING APPARATUS PRODUCING VISUALLY MATCHED DISPLAYS OF PERCEPTUALLY DISTINCT REPRODUCED IMAGES, filed in the names of P. Alessi et al. on Dec. 27, 1988.

BACKGROUND OF THE INVENTION

1. Field of the Invention

The present invention relates generally to color image reproduction apparatus. More particularly, the invention relates to apparatus that produces a hard copy reproduction, on any of a plurality of image-receptive materials, which visually matches a particular video image displayed.

2. Description of the Related Art

Color image reproduction systems known in the art permit an operator to edit the color and composition of an original image to form a reproduced image. For example, U.S. Pat. No. 4,500,919 discloses an image reproduction system of one type in which an electronic reader scans a positive color image, which may be in the form of a transparency or a print, and converts it to an electronic image. A computer workstation and an interactive operator interface, including a video monitor, permits an operator to edit the image by means of displaying it on the monitor. When the operator has composed a desired image on the monitor, the workstation causes an output writer device to make an inked output of the reproduced image.

Color imaging apparatus is most valuable if the reproduced image shown on a video display, the soft copy proof, can be visually matched by the hard copy produced by an output writer. The problem of producing a hard copy of a reproduced image which visually matches a soft copy proof is demonstrated when an image-bearing signal is sent to a video display and an output writing device. The reproduced images will not visually match each other since the phosphor spectral characteristics and other image reproduction properties of the video display differ from the image colorant characteristics and other image reproduction properties of the output writing device and image-receptive material. Furthermore, the intended viewing environments for the reproduced images may greatly differ, depending on the hard copy medium chosen.

The problem of visually matching the hard copy to the video image is amplified when a color image reproduction system is capable of forming a hard copy image on a variety of image-receptive output media of different types. This is because each type of hard copy output medium has unique color reproduction properties.

SUMMARY OF THE INVENTION

In view of the foregoing, an object of the invention is to enable an operator of color image reproduction apparatus to preview a reproduced color image and then to write a visually matched copy of the reproduced image previewed onto any of a variety of different types of image-receptive output media. This object is achieved by computer-controlled means (1) for displaying a reproduced image on a video monitor (a soft copy proof), and then (2) for adjusting an image-bearing signal to an output film writer in accordance with the color reproduction properties of the particular output medium the reproduced image is to be written upon. Whatever output medium is selected, the reproduced hard copy image visually matches the soft copy displayed. Those skilled in the art will understand, of course, that the colors to be matched are required to be within the color gamut of the hard copy medium employed.

In a presently preferred embodiment of color image reproduction apparatus, an output film writer functions to expose either a negative film or a reversal film to image-bearing light corresponding to a reproduced image. Prior to an exposure, a computer-based workstation, in response to an operator-controlled keyboard, edits an original image by manipulating imaging data in a device-independent perceptually based color space. Preferably, the color space, referred to hereinafter as the "database color space", should be perceptually uniform and should describe the appearance of an image in a specified viewing environment. For example, the database must account for the relative luminance level of the image surround, chromatic adaptive state of the observer, viewing flare, etc.

The workstation also serves to transform imaging data in database color space terms to red-green-blue (RGB) terms in color spaces related, respectively, to the video monitor and to the output film writer. For example, the values for the imaging data in the RGB color space for exciting the phosphors of the video monitor determine the color or look of the reproduced image that appears on the video monitor (the soft copy proof). Similarly, the values of the imaging data in RGB terms for the writer are functionally dependent on the type of output film (negative or reversal) to be exposed.

To achieve the object of the invention, the values for the imaging data in the RGB color space for driving the film writer are functionally related to the color or look of the soft copy proof as well as the type of output film to be exposed. If a reversal output film is to be exposed, the RGB terms for the film writer are adjusted to produce a reproduced image, visually matched to the soft copy proof, directly on the reversal film. If a negative output film is to be exposed, on the other hand, the RGB terms for the film writer are functionally related to producing the look of the soft copy proof on the particular type of material the negative film is eventually to be printed upon.

In an alternate preferred embodiment, color image reproduction apparatus enables an operator to preview a reproduced image on the video monitor as the image would appear on each one of a variety of different types of media; the apparatus then provides for writing a visually matched version of the reproduced image that the operator prefers onto any particular image-receptive output medium.

By using the keyboard to select various combinations of film, and print material if the film is of the negative type, the operator causes the workstation to selectively show a series of displays of the reproduced image on the video monitor. The operator can also modify and aesthetically enhance each image.

An operator can evaluate each soft copy proof of the reproduced image and pick the one preferred prior to actually exposing an output film, negative or reversal. Once an operator produces a desired version of the reproduced image, the computer-based workstation then causes the output film writer to be driven so that particular version of the reproduced image is produced on whichever output medium is selected for the hard copy, i.e. the hard copy is visually matched (has the same look) as the soft copy proof preferred.

To that end, the workstation adjusts the aforementioned image-bearing signal in accordance with the soft copy image preferred and in accordance with the color reproduction properties of the output medium selected. In other words, the workstation causes the output film writer to write a reproduced image, visually matched to the preferred soft copy proof, directly onto a reversal film if it is selected, or the workstation causes the film writer to expose a negative film such that the reproduced image appearing on the type of material the negative film is eventually to be printed upon is visually matched to the soft copy proof. Needless to say, the film writer exposes a negative film in a way that assumes that the negative film is to be printed onto a print material in a particular manner.

Thus, the invention offers the advantage of providing hard copies of a reproduced image, on any of a variety of different outputs, that are visually matched to a soft copy proof and to each other. This advantage, as well as other advantages of the invention, will become more apparent in the detailed description of a preferred embodiment presented below.

BRIEF DESCRIPTION OF THE DRAWINGS

The invention will be described with reference to the accompanying drawings, wherein:

FIG. 2 (FIGS. 2A and 2B) is a diagrammatic illustration, in accordance with the teachings of the invention, of the manner in which a reproduced image to appear on any of a plurality of image-receptive output media is visually matched to a reproduced image shown on a video monitor.

DETAILED DESCRIPTION OF PREFERRED EMBODIMENTS

Figure 1:
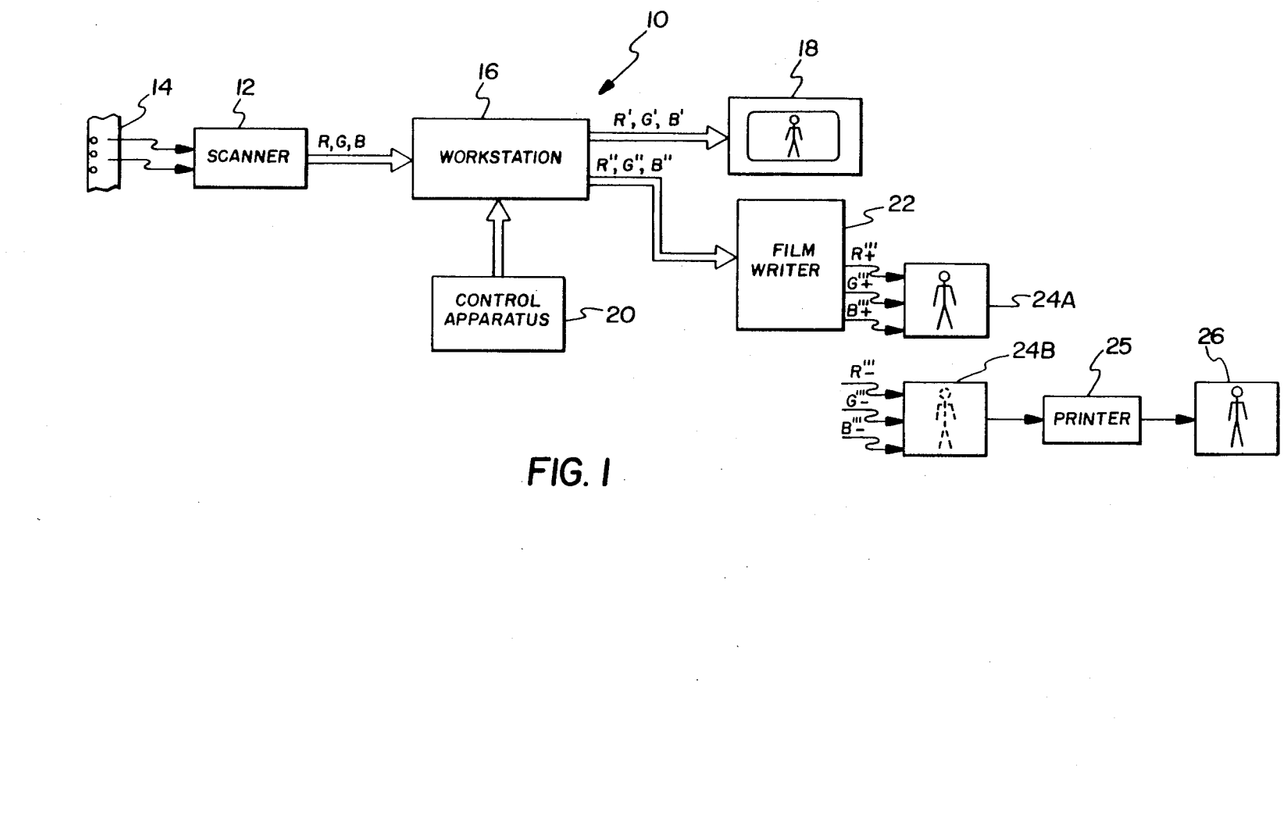
FIG. 1 is a block diagram of color image reproduction apparatus in accordance with a preferred embodiment of the invention.

FIG. 1 shows, in block diagram form, color image reproduction apparatus 10 in accordance with a preferred embodiment of the invention. An operator edits electronically the color and composition of an original photographic image to produce an aesthetically modified image, referred to hereinafter as a "reproduced image". To that end, an image scanner 12 serves for scanning an original image on a photographic input film 14 and for producing red (R), green (G) and blue (B) image-bearing signals in digital form. A computer-based workstation 16, which receives the image-bearing signals from the scanner 12, enables the operator to modify (color and/or composition) the original image to construct the reproduced image. For that purpose, a video monitor 18 serves to display an image corresponding to an R'G'B' image-bearing signal provided by the workstation 16. Control apparatus 20, including a keyboard and a cursor, enables the operator to provide image manipulation commands pertinent to modifying the video image displayed.

Color image reproduction apparatus 10 provides an electronic retouching and photocomposition capability to users including commercial photographic laboratories and retouchers. To meet user needs, the scanner 12 is capable of digitizing an image from a negative film, such as KODAK VERICOLOR III Film manufactured by Eastman Kodak Company, or a reversal film, such as KODAK EKTACHROME Film or KODACHROME Film. Further towards meeting user needs, the scanner 12 receives negative or reversal film of various size ranging from 135 format to a sheet of approximately 20 centimeters (cm) by 25 cm.

The image reproduction apparatus 10 is further capable of forming a hard copy reproduction of the soft copy displayed on any of a variety of image-receptive output media. To that end, a film writer 22, in response to the workstation 16 supplying an R"G"B" signal corresponding to a final reproduced image displayed, then writes the reproduced image onto either an output film 24A of the reversal type or an output film 24B of the negative type. The aforementioned KODAK VERICOLOR III Film serves as a suitable negative film 24B and KODAK EKTACHROME 100 Film as a reversal film 24A. If a negative film is exposed, a printer 25 produces a positive hard copy of the reproduced image, preferably by optically printing the negative onto a print material 26. KODAK EKTACOLOR PLUS Paper, KODAK EKTACOLOR Professional Paper, and KODAK DURATRANS Display Material are preferred print materials.

It will be appreciated by those skilled in the photographic art that perceptible color-content of a hard copy of an image varies from one type of output medium to another. Moreover, for a particular type of print material, the color of an image varies depending upon the type of negative film the image is printed from. In accordance with the invention, the image reproduction apparatus 10 serves to form a hard copy of the reproduced image, on whichever output media is selected (reversal-type film or combination of negative-type film/print material), that is visually matched to the video image displayed. In other words, either the image on the print material 26 or the image on reversal film 24A, whichever medium is selected, is visually matched with the reproduced image displayed on the video monitor 18. Since any hard copy of a given image is visually matched to the soft copy proof, multiple hard copies of the same image on respectively different media are, of course, visually matched to each other.

FIG. 2 illustrates diagrammatically the manner in which a reproduced image shown on the video monitor 18 (soft copy) is visually matched by the reproduced image to appear on the output medium (hard copy) selected. First, the scanner 12 converts a color image on a given input film (reversal or negative) into red (R), green (G) and blue (B) image-bearing signals. The workstation 16 then transforms each image-bearing signal from RGB color space to the database color space.

Transformations of RGB imaging data to a common color representation let images from a variety of different types of input films be used interchangeably for reproduction purposes, regardless of source. For that purpose, an image on a negative film is encoded into database color space terms that a reversal film, for example KODAK EKTACHROME Film, would have produced for the same scene. The greater exposure latitude of the negative film is handled by appropriately adjusting the scanner-measured densities such that an optimum image results.

Region 30 represents the transformation to the database color space from RGB imaging data corresponding to an image on a film A, for example a reversal film; a different region, denoted 32, illustrates the transform into database color space terms from RGB imaging data corresponding to an image on a film B, for example a negative film.

The transform from RGB space to database color space is different for each type of input film scanned. Region 34 represents the transform to database color space terms from RGB terms for an image on an input film N (reversal or negative) of a type different from any of the other input films (reversal or negative).

The functional relationship between an RGB color space for a given film and the database color space, represented by one of the regions 30, 32, 34, etc., is determined by using laboratory test data. For example, a scanner functions for reading R, G, and B density values from color test strips for a particular film; spectrophotometric methods, known in the photographic art, serve to provide data needed to calculate the transformation into database color space.

The workstation 16 has an internal memory capable of storing multiple original images and a "work-in process" image. A work-in-process image can consist of, for example, an original image, whether or not modified to some degree, or the blending of two or more images (original or modified) to form a composite image. Region 36 of FIG. 2 represents the manipulation within workstation 16 of one or more original images in database color space terms to derive a final reproduced image, denoted 38.

To assist in the editing of an image, video monitor 18 serves to display a work-in-process image as it is being modified within the workstation 16 under the influence of operator-generated commands from the control apparatus 20. To produce a video display of a work-in-process image, the workstation 16 further serves to transform a signal, corresponding to the image presently in the database, to RGB terms from database color space terms, in accordance with the phosphor spectral characteristics and other image reproduction properties of the video monitor 18. Region 39 represents the functional relationship for transforming to RGB video terms from database color space terms for a work-in-process image.

Figure 2A:
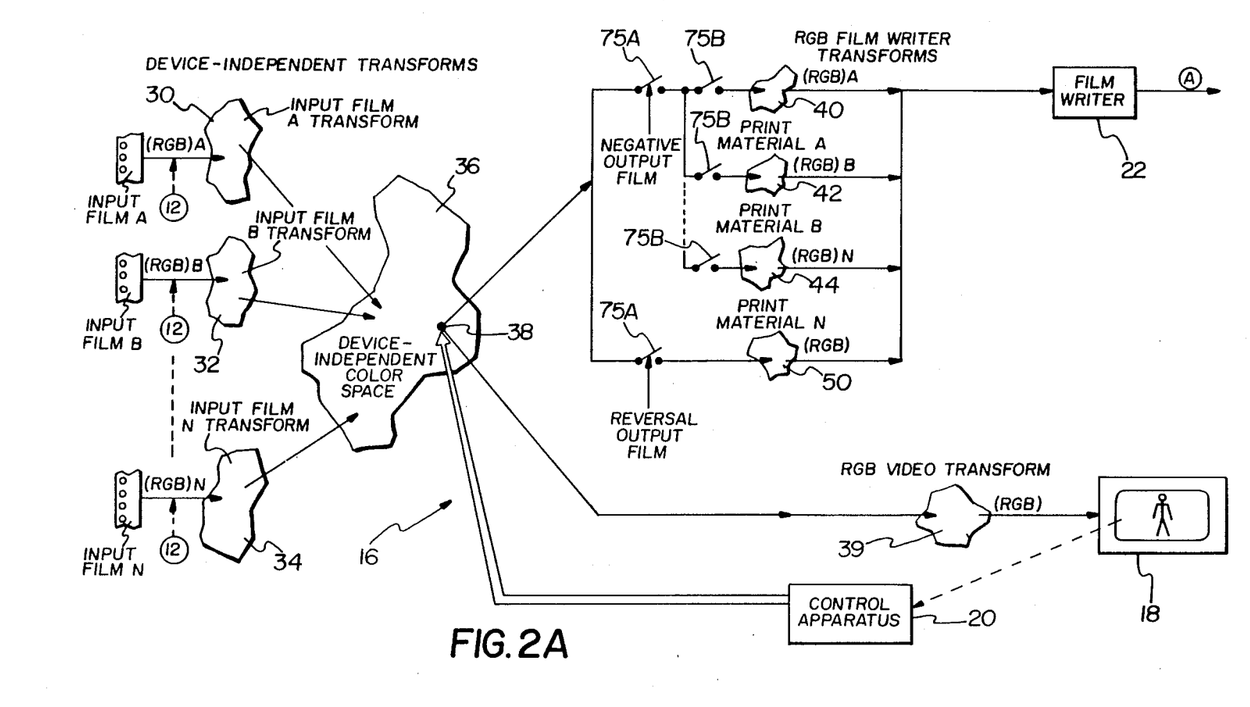
Figure 2B:
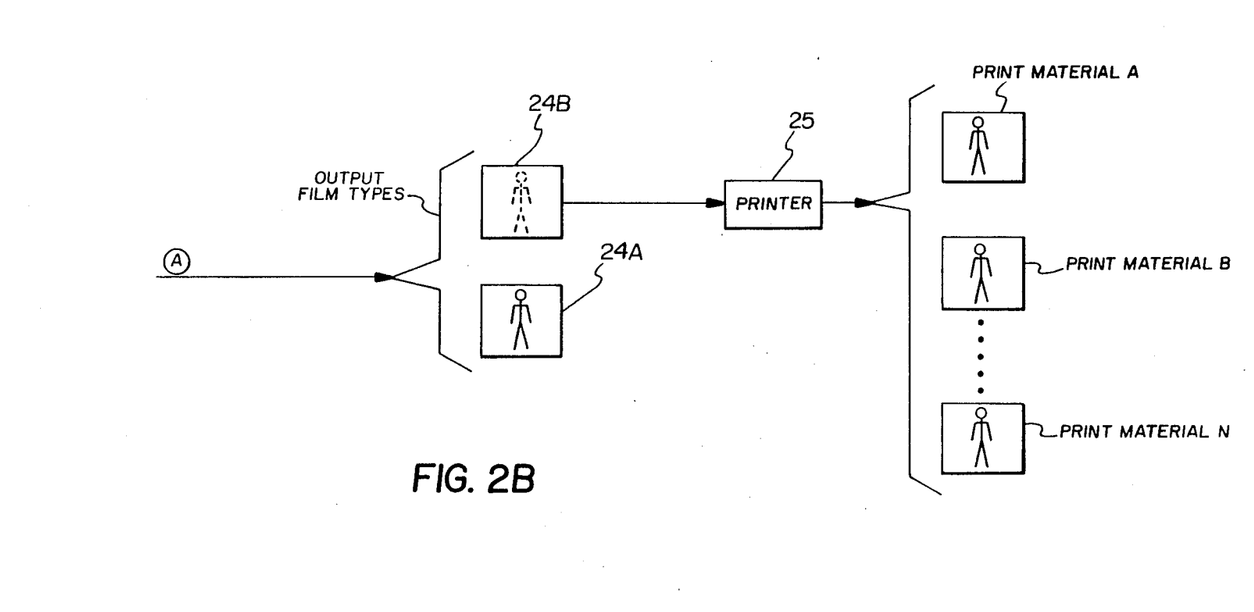

Film writer 22 serves to expose either a reversal film or a negative film to a reproduced image. FIG. 2B illustrates that the negative film 24B is intended to be printed subsequently onto any of a variety of print materials. As described previously herein, KODAK EKTACOLOR PLUS Paper, KODAK EKTACOLOR Professional Paper, or KODAK DURATRANS Display Material are selected for printing a hard copy from the output negative film 24B.

When the negative output film 24B is to be exposed, the image to appear on the print material to be exposed from the negative is visually matched to the image displayed on the video monitor 18. For that purpose, the database color space values are transformed into corresponding values appropriate for the selected combination of output film and print material. Regions 40, 42 and 44 of FIG. 2, which are different from each other, illustrate that, for the negative output film 24B, the transform to RGB film writer terms from the database color space is functionally dependent upon the type of print material selected for exposure from the negative.

When the reversal output film 24A is to be exposed, the image to appear directly on such film is also visually matched to the image displayed on the video monitor 18. To that end, the transform region 50 illustrates that the transforming to RGB film writer space from the database color space is also functionally dependent on the type of output film selected.

Preferably, film writer 22 is of the type described in U.S. Pat. No. 4,631,551, assigned to the assignee of the present invention, in which each electro-optical modulator includes a lanthanum-doped lead zirconate titanate (PLZT) material which changes the intensity of image-bearing light in response to an applied electric signal. Again, however, each transformation is different, as represented by the different regions 40, 42, 44 and 50, to account for differences in the color reproduction properties of the output film (reversal or negative) selected for exposure and to account for differences in the color reproduction properties of the print material selected if the negative film 24B is exposed.

The functional relationship between database color space terms and corresponding RGB terms for a given output medium, represented by one of the regions 40, 42, 44 and 50, is determined by laboratory test data. To that end, the film writer 22 first generates calibration data in the form of standard color test strips on each output film (or combination negative film/print material). For each standard color, the set of RGB input drive signals are recorded which, in turn, have a corresponding unique set of database color space values.

Figure 3:
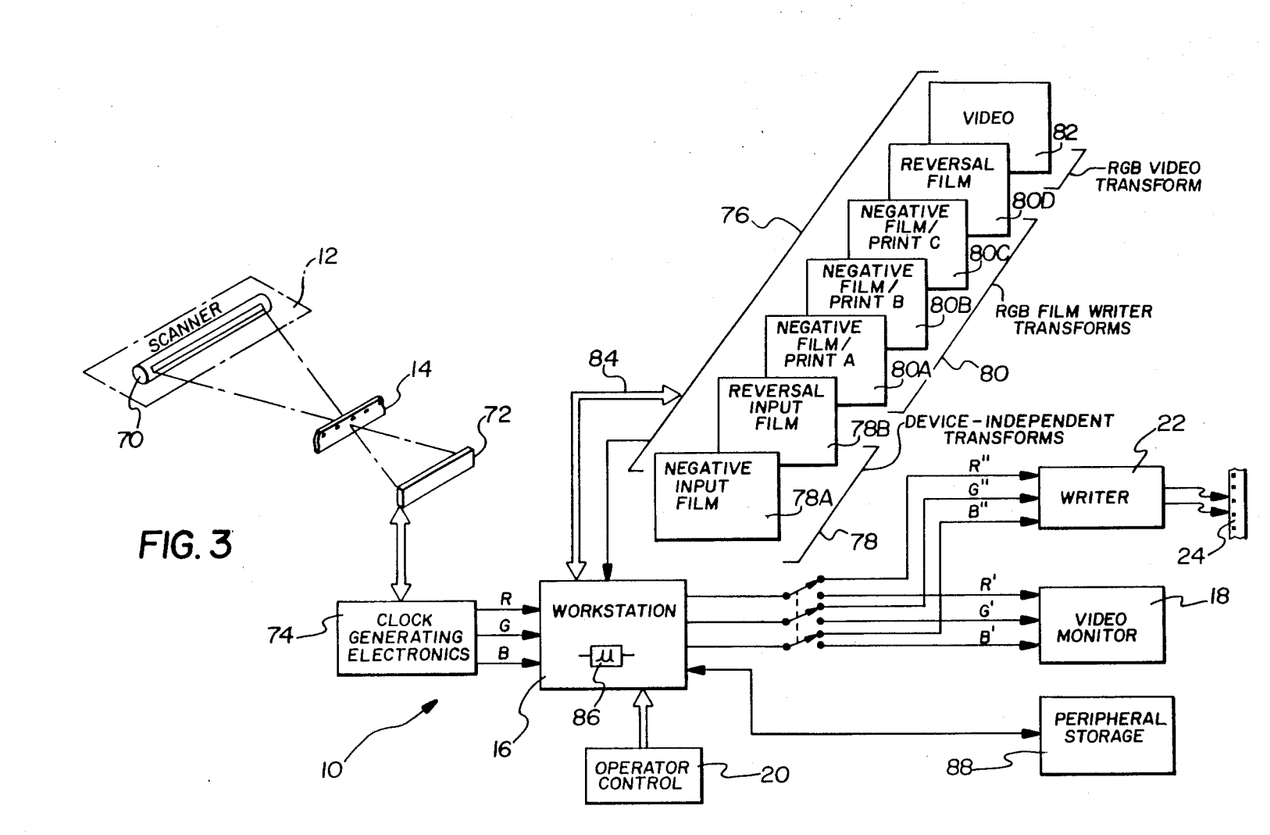
FIG. 3 shows in further detail color image reproduction apparatus in accordance with the invention.

FIG. 3 shows, in further detail, color imaging apparatus 10 that permits an operator to edit the color and composition of an original photographic image and to produce a hard copy, on any of a variety of different types of output media, that is visually matched to a soft copy display. For that purpose, the imaging apparatus 10, in accordance with the teachings of the present invention, visually matches the hard copy image to appear on the output medium selected with the reproduced image displayed on the video monitor 18. To that end, the imaging apparatus 10 employs a variety of digitally operated look-up tables (LUTs), each of which is functionally related to a particular output medium selected, for transforming the reproduced image from database color space terms into appropriate R"G"B" film writer drive signals.

The image scanner 12, which has a light source 70 defining preferably a line of diffuse illumination, serves for scanning an image on the photographic input film 14 (reversal or negative). For that purpose, the film 14 is mounted on a movable drum, table or the like (not shown) for stepwise movement in a line scan direction, preferably under the influence of a stepper motor (also not shown).

A charge coupled device (CCD) linear image sensor 72, arranged to receive a line of light modulated in accordance with the film image, includes an overlay comprising three parallel arrays of color filters—red (R), green (G), and blue (B). This "tri-linear" image sensor 72 further includes three corresponding parallel output registers which are coupled, respectively, to an output of one of the color filter arrays. Thus, the respective outputs from the three registers correspond to R, G and B image-bearing signals.

Clock generating electronics 74 serves to control the CCD sensor 72 and to process its output signals to produce, in a known manner, a high-resolution RGB image-bearing signal corresponding to the film image. The clock generating electronics applies R, G, and B signals in digital form to the microprocessor-based workstation 16 for subsequent operations.

A tri-linear image sensor array and corresponding clock generating electronics of the type disclosed herein are the subject of U.S. Pat. No. 4,278,995 entitled COLOR LINE SENSOR FOR USE IN FILM SCANNING APPARATUS, assigned to the assignee of this invention and the disclosure of which is incorporated herein by reference.

The microprocessor-based workstation 16 enables an operator to modify (color, sharpness, and/or composition) the digital image. To that end, the video monitor 18, which includes a frame store and a digital to analog (D/A) converter, serves to display an image corresponding to R'G'B' signals provided by the workstation 16. Sun Microsystems Inc., Mountain View, California, manufactures an interactive workstation of this general type.

The operator control apparatus 20, preferably including a keyboard and a mouse or tablet, enables an operator to interact with the workstation 16 to provide input information such as input film type and film size, image-manipulation commands pertinent to modifying the image displayed, and output information such as output film type/print material type.

The image-manipulation commands enable an operator to edit a single image or combine two or more images into a single composite image. To that end, the control apparatus 20 includes a series of image-manipulation functions that allow an operator to modify an image (single or composite). The following operator-controlled functions are exemplary:

CROP—eliminates unwanted portions of image edges;
REPLICATE—"stretch" an image by repetition of selected portions;
SIZE CHANGE—magnifies image size by a specified factor;
MASK—defines "regions of interest" by boundary specifications;
CUT—extract a selected image portion;
PASTE—combine one image with another;
COLOR BALANCE—change overall image color;
CONTRAST—manipulate contrast curves;
HUE/CHROMA/LIGHTNESS—independent control of color quantities;
SIMULATE IMAGING MEDIA—emulate appearance of various image receptive materials.

The workstation 16 also has available to it color imaging data in R"G"B" space for driving the film writer 22. The keyboard signals the output film type by means of closing the appropriate switch 75A (FIG. 2A); when a negative film is to be exposed, the keyboard signals the print material selected by causing the appropriate one of the switches 75B (also FIG. 2A) to close.

FIG. 3 shows, in further detail, that the workstation 16 of the color image reproduction apparatus 10 has associated with it a bank of storage devices 76 that individually serve as a digitally operated LUT for transforming image data in one color space to data representing the same image in a different color space. A first set of storage devices 78 functions to transform RGB data, corresponding to an original image read from an input film, to database color space data. LUT 78A for example, serves to transform RGB data, corresponding to an original image on a negative film, to the database color space image data; a second LUT 78B transforms RGB data, corresponding to an image from a reversal film, to database color space.

A second set of storage devices 80 functions to transform imaging data to appropriate RGB film writer terms from database color space terms for the purpose of visually matching a hard copy to appear to the soft copy proof, in accordance with the teachings of the invention. When the negative output film 24B is to be exposed, LUTs 80A, 80B, 80C serve, respectively, to transform imaging data to RGB film writer terms appropriate for producing a hard copy image, visually matched to the video image displayed, when the negative film is printed onto a material of type A, a material of type B, or a print material of type C.

When the reversal output film 24A is to be exposed, LUT 80D functions to transform database color space imaging data to RGB film writer terms appropriate for matching the image to appear directly on the reversal film with the video display.

A LUT 82 serves to transform database color space data to appropriate RGB video data to produce the soft copy displayed.

To convert image data into a desired color space, the workstation 16, by means of a LUT select line 84, retrieves "transform" data from the appropriate LUT. One or more processing devices, denoted by a microprocessor 86, perform, under program control, both logic operations to retrieve data values from the correct addresses of the LUT selected and arithmetic operations for linear interpolation on the values retrieved.

When a desired image has been composed on the video monitor 18, an operator may make a machine-readable record of the image displayed. To that end, a peripheral storage device 88, such as a magnetic tape or magnetic disk, functions to record image-bearing signals, preferably in database color space terms, corresponding to the final image composed.

As described previously herein, each hard copy medium has unique color reproduction properties that cause the look of a given image to vary from one medium to another. In an alternate preferred embodiment, color image reproduction apparatus 10 causes the video monitor 18 to display a reproduced image as the image would appear on each one of a variety of different media. This is accomplished in accordance with the teachings of the aforementioned copending U.S. patent application entitled COLOR IMAGING APPARATUS PRODUCING VISUALLY MATCHED DISPLAYS OF PERCEPTUALLY DISTINCT REPRODUCED IMAGES, the disclosure of which is incorporated herein by reference. The apparatus 10 then provides for writing a visually matched version of the reproduced image that an operator prefers, regardless of the medium the image displayed is presumed to appear on, onto any particular image-receptive output medium.

Referring back to FIG. 2A, film writer 22 serves to expose either a reversal film or a negative film to produce a hard copy reproduction that is visually matched with the version of the reproduced image preferred by an operator. To that end, FIG. 2A diagrammatically illustrates that the control apparatus 20 causes the workstation 16 to load its memory with database color space data corresponding to the version of the reproduced image 38 that is preferred.

For that purpose, the workstation 16, in response to operator-generated image-manipulation commands, processes a subsample of the database color space imaging data. In doing so, the workstation 16 maintains a log of the net operations performed on the subsample, e.g. CUT, PASTE, CONTRAST, OUTPUT MEDIUM simulated by soft copy, etc. Once a desired version of the reproduced image is shown on the monitor 18, the operator, by means of the control apparatus 20, causes the net effect of the operations applied to the subsample to then be applied to the full array of imaging data stored in memory. To that end, it will be clear to those skilled in the art that an additional set of LUTs can be used for the purpose of transforming data corresponding to any soft copy image preferred, including the medium used to simulate the soft copy, to corresponding data in database color space terms.

The operator, after selecting the soft copy image preferred, now selects the output medium on which a visually matched copy reproduction is to be formed. Bear in mind, the output film actually selected can be different from the film chosen to produce the soft copy appearance preferred. Similarly, if a negative output film is to be exposed, the print material actually selected can be different from any print material chosen to simulate the image appearance preferred (the soft copy proof).

As with the embodiment of FIG. 2, the workstation 16 closes the appropriate one of the switches 75A corresponding to the particular output film (reversal or negative) that the operator desires to be exposed. Similarly, the operator, through the workstation 16, causes the appropriate one of the switches 75B to close corresponding to the print material desired if a negative output film is to be exposed.

It will be understood that multiple types of negative output film and reversal output film may be employed. Accordingly, additional switches 75A and 75B and additional RGB film writer transforms would be used, respectively, for selecting among the available output films and print materials and for converting database color space data to appropriate film writer RGB terms.

The invention has been described in detail with reference to the figures; however, it will be appreciated that variations and modifications are possible within the spirit and scope of the invention. Patentable features disclosed but not claimed herein are disclosed and claimed in the aforementioned U.S. patent application Ser. No. 290,676 filed on even date herewith.

What is claimed is:

1. In color image reproduction apparatus including a video monitor for displaying a reproduced image, wherein the improvement comprises:
   (a) an input device arranged for producing a set of input signals corresponding to an original image on either (1) a film of the negative type or (2) a film of the reversal type;
   (b) a writer device energizable for forming an image on an output film of the negative type or on an output film of the reversal type; and
   (c) computer-based control means, having an input coupled to said input device and having respective outputs coupled to said video monitor and to said writer device, for manipulating the set of input signals to form a reproduced image, which is a modification of the original image, on said video monitor and for causing said writer device to form an image (1) directly on output film of the reversal type that is visually matched to the reproduced image displayed on said video monitor, or (2) on output film of the negative type such that when that image is transferred to a print material the image on the print material is visually matched to the reproduced image displayed on said video monitor.

2. In color image reproduction apparatus including a video monitor for displaying a reproduced image, wherein the improvement comprises:
   (a) an output device energizable for causing an image to appear on any of a variety of image-receptive output media having perceptually distinct color reproduction properties;
   (b) first computer-based control means, coupled to said video monitor, for causing a series of perceptually distinct displays of a given reproduced image to appear on said video monitor with each version of the reproduced image shown being visually matched to the image as it would appear on a particular image-receptive media which may or may not be common to the aforementioned output media; and
   (c) second computer-based control means, coupled to said output device, for causing an image, visually matched to a particular version of the reproduced image displayed on said video monitor, to appear on any of the image-receptive output media.

3. In color image reproduction apparatus including a video monitor for displaying a reproduced image, wherein the improvement comprises:
   (a) an output device energizable for causing an image to appear on any of a variety of image-receptive output media having perceptually distinct color reproduction properties;
   (b) first computer-based control means, coupled to said video monitor, for causing a series of perceptually distinct displays of a given reproduced image to appear on said video monitor with each version of the reproduced image shown being visually matched to the image as it would appear on a particular one of the image-receptive output media; and
   (c) second computer-based control means, coupled to said output device, for causing an image, visually matched to a particular version of the reproduced image displayed on said video monitor, to appear on any of the image-receptive output media.

4. In color image reproduction apparatus including a video monitor for displaying a reproduced image, wherein the improvement comprises:
   (a) a scanner arranged for producing a set of input signals corresponding to an original image on either (1) a film of the negative type or (2) a film of the reversal type;
   (b) a writer device energizable for forming an image on an output film of the negative type or on an output film of the reversal type;
   (c) first computer-based control means, coupling said scanner and said video monitor, for manipulating the set of input signals to form a reproduced image, which is a modification of the original image, and for causing different perceptually distinct versions of the reproduced image to appear on said video monitor with one version displayed being visually matched to the reproduced image as it would appear directly on output film of the reversal type and another version displayed being visually matched to the reproduced image as it would appear when a negative of the reproduced image is formed on output film of the negative type and that negative image is transferred to a print material; and (d) second computer-based control means, coupling said first computer-based control means and said writer device, for causing an image, visually matched to a particular one of the perceptually distinct versions of the reproduced image displayed on said video monitor, to appear either directly on output film of the reversal type or indirectly on a print material when said writer device forms an image on output film of the negative type.

* * * * *